United States Patent [19]
Soriente

[11] 3,715,033
[45] Feb. 6, 1973

[54] FILTER CARTRIDGE
[75] Inventor: Alfonse J. Soriente, Gillette, N.J.
[73] Assignee: Ecodyne Corporation
[22] Filed: Nov. 9, 1970
[21] Appl. No.: 87,698

[52] U.S. Cl..................................210/193, 210/338
[51] Int. Cl. ............................................B01d 29/08
[58] Field of Search........210/75, 193, 457, 323, 333, 210/338, 489, 499, 332

[56] References Cited
UNITED STATES PATENTS
2,047,793  7/1936  McKinley.........................210/489 X
3,422,958  1/1969  Newman..........................210/457 X Primary Examiner—Frank A. Spear, Jr.
Attorney—Charles M. Kaplan and Joel E. Siegel

[57] ABSTRACT

A precoat filter cartridge for removing impurites from a liquid, comprising: a rigid tubular core element having holes therein, said holes having a total area in the range of 3 to 9 percent of the total surface area of said core element; a layer of course screen wrapped about said core element; and a layer of fine mesh screen wrapped about said layer of course screen.

4 Claims, 2 Drawing Figures

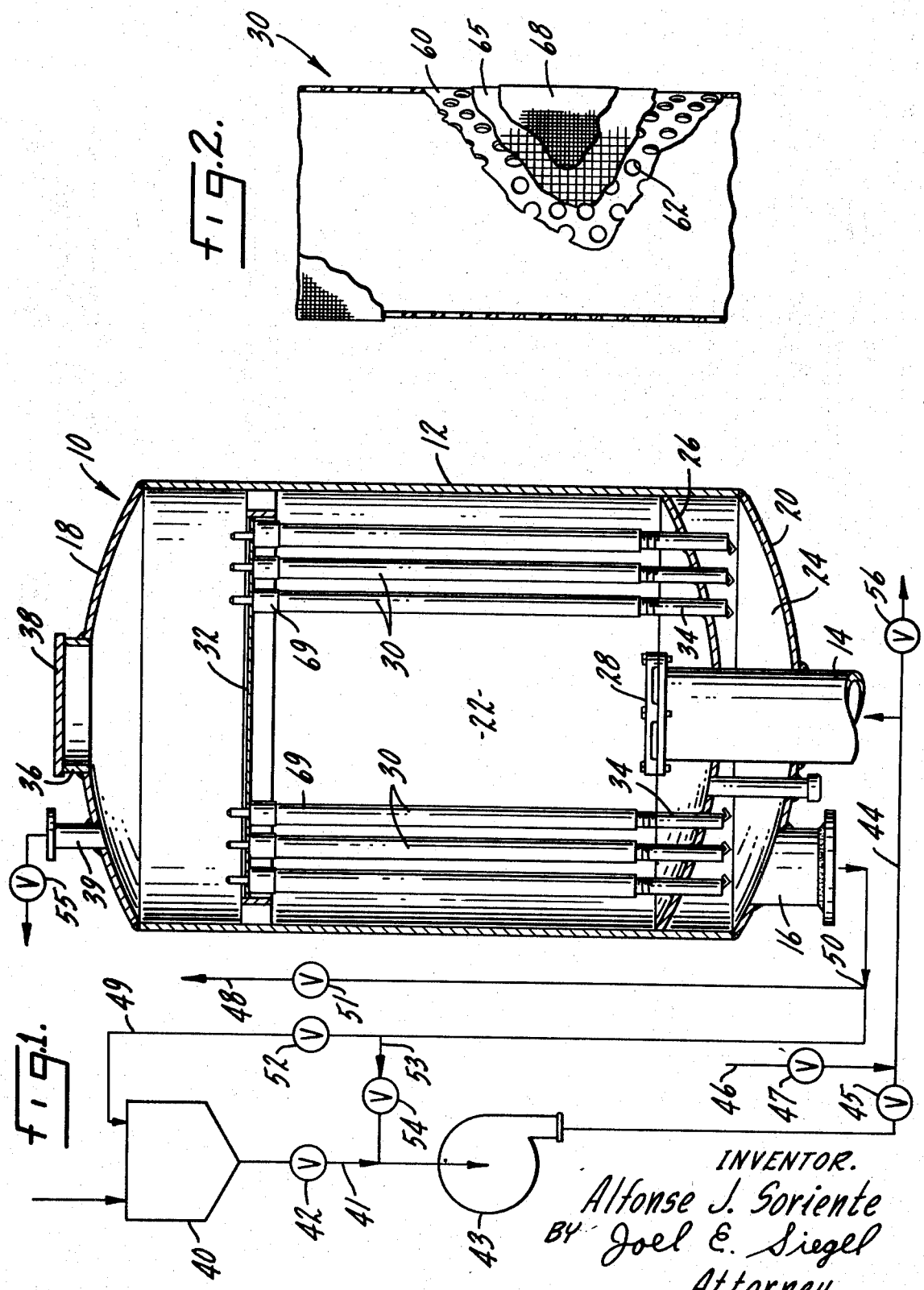

FILTER CARTRIDGE

BACKGROUND OF THE INVENTION

The present invention relates to an improved filtration apparatus and more particularly to an improved precoat filter cartridge.

Liquids may be very effectively purified by passing them through a filter screen which has been precoated with a layer of ion exchange resin particles in the size range of 60 to 400 mesh, hereinafter referred to as precoat medium. This method is disclosed in U.S. Pat. No. 3,250,703, issued May 10, 1966, and assigned to the assignee of this invention.

In the typical system of this type a plurality of filter cartridges are spaced within a filter tank. In order to precoat the filter cartridges a liquid slurry of precoat medium is passed through the filter tank. A precoat layer of precoat medium is thereby deposited upon the upstream sides of the filter cartridges. A precoat layer of uniform distribution throughout the entire length of the filter cartridges is desirable for maximum utilization of the system.

Prior precoat filter cartridges of this type include a core element of suitable corrosion resistant material having openings therein whose area is approximately 13 percent of the total surface area of the body portion. This core element is covered with a layer of coarse screen which, in turn, is wrapped with a layer of fine mesh screen.

Precoating of such cartridges has resulted in an uneven distribution of the precoat material on the fine mesh screen. The precoat medium tends to build up on the lower portion of the screen while the upper portion remains relatively bare. Thus, the portion of the water to be treated which passes through the upper portion of the filter cartridge does not have all the impurities removed. In order to solve this problem the core element had been altered such that the lower half of the core element remained at 13 percent open area while the upper half had been increased to 24 percent open area. By so doing the pressure drop across the bottom half of the filter cartridge is greater than the pressure drop across the upper half thereby increasing the precoat slurry flow through the upper half of the filter element. Although this has resulted in an improved precoat distribution the lower portion of the filter cartridge still tends to build up at a more rapid rate than the upper portion.

SUMMARY OF THE INVENTION

It is a primary object of the present invention to provide an improved precoat filter cartridge for removing impurities from a fluid.

Another object of the present invention is to provide a precoat filter cartridge that will precoat uniformly throughout the entire length of the cartridge.

A further object of the present invention is to provide a precoat filter cartridge that distributes the precoat slurry evenly throughout the entire length of the cartridge.

With these and objects in mind the present invention provides a precoat filter cartridge, comprising: a rigid tubular core element having holes therein, said holes forming a total open area in the range of 3–9 per cent of the total surface area of said core element; a layer of coarse screen in the size range of 6–10 mesh wrapped around said core element; and a layer of fine mesh screen approximately 50×250 mesh wrapped around said layer of coarse screen. It has been discovered that by uniformly reducing the percent of open area of the surface of the core element the resulting increase in pressure drop causes the precoat slurry to flow up towards the top of the filter cartridge thereby resulting in a uniform distribution of the precoat medium.

DESCRIPTION OF THE DRAWINGS

Other objects and advantages of the invention will hereinafter become more fully apparent from the following description of the annexed drawing, which illustrates a preferred embodiment, and wherein:

FIG. 1 is a schematic representation of a filtering system employing the filter cartridges of the present invention, the filter tank of the system being partially cut away to illustrate the filter cartridges in the filter tank; and FIG. 2 is an enlarged cross sectional view of a portion of one of the filter cartridges illustrated in FIG. 1, showing the core element, the layer of coarse screen, and the layer of fine screen, which are the subject of the present invention.

DESCRIPTION OF THE PREFERRED EMBODIMENT

Referring to FIG. 1, there is illustrated schematically a filter system indicated generally by the reference numeral 10, for removing dissolved and undissolved impurities from water in accordance with the present invention. Although the present invention will be discussed in detail with respect to the purification of water, the present invention has application to the purification of gasses and other liquids.

The filtration system 10 comprises a filter tank 12 having an inlet conduit 14 and an outlet conduit 16. Filter tank 12 is a generally cylindrical vessel made of steel, or the like having outwardly convex top and bottom end portions 18 and 20 respectively. Tank 12 is partitioned into an influent zone 22 and an effluent zone 24 by a downwardly convex tube sheet plate 26 suitably secured to the interior of the tank by welding or the like.

Inlet conduit 14 enters tank 12 through the bottom end 20 and passes upwardly through effluent zone 24 and plate 26 to communicate with influent zone 22. Conduit 14 is attached to plate 26 by welding or the like, so as to preclude fluid leakage from influent zone 22 to effluent zone 24. Fluid entering influent zone 24 through inlet conduit 14 is distributed radially outwardly by distribution plate 28.

Mounted within the influent zone 22 are a plurality of filter cartridges 30 through which the influent stream must pass before entering effluent zone 24 and being discharged from filter tank 12 through outlet conduit 16. Each filter cartridge 30 is held in place in influent zone 22 of filter tank 12 by a holding assembly, indicated generally by reference numeral 32. The selection of a suitable holding assembly would, of course, be within the ordinary skill of one in the art. In this instance holding assembly 32 is of the type disclosed and claimed in U.S. Pat. No. 3,279,608, assigned to the assignee of the present invention. Holding assembly 32 is adopted to releasably hold filter cartridge 30 in place upon filter seat means 34 which is attached to plate 26. The filter cartridges 30 are placed into and removed from filter tank 12 through a manhole opening 36 in filter tank 12. Manhole opening 36 has a cover means 38 which may be removed or opened, as desired, to provide access to the interior of filter tank 12.

Filter seat means 34 comprises a small pipe made of steel or the like which extends through a hole in plate 26 and is attached to plate 26 by welding or other suitable means. Filter seat means 34 is substantially parallel to the longitudinal axis of filter tank 12 and connects influent zone 22 with effluent zone 24. Filter seat means 34 provides a base for filter cartridge 30, which is held in position on means 34 by holding assembly 32.

The filter tank is also provided with a vent 39. Vent 39 may be of any suitable construction, the selection of appropriate vent means being dependent generally upon the specific use of the filter system 10.

A water slurry of particular precoat medium, (e.g., finely divided ion exchange resin particles in the size range of about 60 to 400 mesh) is stored in a precoat tank 40. A slurry line 41, controlled by a slurry valve 42, connects precoat tank 40 with a slurry pump 43. A transfer valve 45 adjacent pump 43 and in transfer line 44 controls the passage of slurry from pump 43.

The water to be treated enters filter system 10 through feed line 46 having an intake control valve 47. Feed line 46 is connected to transfer line 44 between control transfer valve 45 and inlet conduit 14.

Outlet conduit 16 is connected to a service line 48 and a precoat return line 49 at a T-juncture indicated by reference numeral 50. Service line 48 is connected to service units not shown, such as steam generator and the like, and has a service valve 51. The precoat return line 49 is connected to precoat tank 40 and has a return valve 52 to control the flow of slurry back to the precoat tank 40. A bridge line 53 with a bridge valve 54 interconnects the precoat return line 49 and the slurry line 41. Filter system 10 is equipped with a vent valve 55 and a drain valve 56.

Referring to FIG. 2, each filter cartridge 30 includes a rigid, non porous, inner core element 60 of suitable corrosion-resistant material such as aluminum or stainless steel. Core element 60 has uniformly spaced holes or slots 62 therein, whose total area is in the range of 3 to 9 percent, and preferably 5 percent, of the total surface area of core element 60. Core element 60 is covered with a layer of coarse drain mesh screen 65, preferably having openings in the size range of 6 to 10 mesh. This coarse screen 65 is, in turn, wrapped with a layer of fine mesh screen 68 preferably of 50×250 dutch weave having particle retension openings of 0.002 inch ± 0.0005 inch. Filter cartridges 30 include a top cap assembly 69, as seen in FIG. 1, welded to body portion 60 so that access to the interior of the cartridges 30 is prohibited except through screens 68, 65, and holes 62. Thus, water entering filter tank 12 must pass through filter screens 68, 65, and holes 62 into cartridge 30 and leave tank 12 through outlet conduit 16.

In preparing the filter system 10 for operation the initial step is to precoat the filter cartridges 30. To these ends, the filter tank 12 is filled with low impurity water, such as demineralized water. A slurry of precoat medium and demineralized water is prepared in precoat tank 40. During the precoat step all the valves are closed, except slurry valve 42, transfer valve 45 and return valve 52. The precoating step is initiated by starting pump 43, thereby drawing the resin precoat slurry from precoat tank 40 through slurry line 41 to pump 43. The slurry is forced by pump 43 through transfer line 44 into filter tank 12 via inlet conduit 14. The pressure of the incoming slurry forces the demineralized water in filter tank 12 through screens 68 and 65 and core elements 60 into filter cartridges 30 and out of the filter tank 12 via outlet conduit 16. This demineralized water enters the precoat tank 40 through the return line 49.

As the cycling continues the precoat slurry is brought into contact with the upstream surfaces of filter screens 68 of filter cartridges 30. The ion exchange resin particles of the precoat medium are separated from the slurry and deposited as a precoat layer upon the upstream surfaces of the screens 68. Because the body portions 60 of cartridges 30 have a relatively low percentage of total open area, preferably approximately 5 percent, a high pressure drop across the filter screens 68 reslults, causing the slurry to be forced upward toward the top of filter tank 12, thereby resulting in a uniform distribution of the precoat layer throughout the entire length of the filter screens 68. The slurry is circulated through the filter system in this manner until a sufficient depth of the precoat material is deposited upon the upstream surface of filter screens 68. The precoating step is terminated by closing slurry valve 42 and return valve 52 and opening bridge valve 54. Pump 43 is kept running until the recycle stream is clear. The filter system is now ready to be used to treat the service liquid.

The service run is begun by closing bridge valve 54 and transfer valve 45 and opening service valve 51 and feed valve 47. This step is preferably timed to maintain sufficient pressure in the system to assure retension of the precoat layer on filter screens 68. In this manner, untreated water enters the filter system through feed line 46, passes through transfer line 44 and passes through inlet conduit 14 to influent zone 22. The pressure of the incoming untreated water forces it through the precoat layers, filter screens 68 and 65 and core elements 60 into filter cartridges 30 and out through outlet conduit 16. As the untreated water passes through the precoat layers dissolved and undissolved impurities are removed from the water. The treated water flows through outlet conduit 16 to service line 48.

Eventually the precoat material will become exhausted and must be replaced. At this time the filtering step is stopped by closing intake valve 47 and service valve 51. Vent valve 55 and drain valve 56 are opened to drain filter tank 12. The filter cartridges 30 are washed by an internal washing system, not described or shown. Another charge of precoat material is then placed in the precoat tank 40 and the process of precoating and filtering described in detail hereinbefore is repeated.

The filter cartridges of the present invention have substantially eliminated the problem of nonuniformity of distribution of precoat medium along the entire length of a filter cartridge. By so doing all of the water to be treated passes through a substantially similar filtering medium with no water leaving the system untreated. Tests have been conducted which confirm that a filter cartridge having a core element with a total open area of approximately 5 percent of the total surface area results in a substantially uniform precoat distribution.

Though the apparatus of the present invention has been discussed primarily in connection with a precoat material of finely divided ion exchange resin particles, it may likewise be used where the precoat material is of another material such as diatomoceous earth, or any other precoat material, as will be understood by those skilled in the art.

Obviously, many modifications and variations of the present invention as hereinbefore set forth will occur to those skilled in the art, and it is intended to cover in the appended claims all such modifications and variations as fall within the true spirit and scope of the invention.

What is claimed is:

1. A precoat filter cartridge for removing impurities from a liquid, comprising:
   a. a rigid tubular core element having holes formed therein, said holes having a total area in the range of 3 to 9 percent of the total surface area of said core element so as to increase the pressure drop across said core element and thereby cause precoat material to flow upward towards the top of said cartridge;
   b. a layer of coarse screen wrapped about said core element; and
   c. a layer of fine mesh screen wrapped about said layer of coarse screen.

2. A precoat filter cartridge for removing impurities from a liquid, comprising:
   a. a rigid tubular core element having holes formed therein, said holes having a total area in the range of 3 to 9 percent of the total surface area of said core element so as to increase the pressure drop across said core element and thereby cause precoat material to flow upwards towards the top of said cartridge;
   b. a layer of coarse screen having openings in the size range of 6 to 10 mesh wrapped about said core element; and
   c. a layer of fine mesh screen approximately 50×250 mesh wrapped about said layer of coarse screen.

3. In the filter cartridge of claim 2 wherein said fine mesh screen has particle retension openings of 0.002 inch ± 0.0005 inch.

4. A precoat filter cartridge for removing impurities from a liquid, comprising:
   a. a rigid tubular core element having holes formed therein, said holes having a total area of approximately 5 percent of the total surface area of said core element so as to increase the pressure drop across said core element and thereby cause precoat material to flow upward towards the top of said cartridge;
   b. a layer of coarse screen having openings in the size range of 6 to 10 mesh wrapped about said core element; and
   c. a layer of fine mesh screen approximately 50×250 mesh wrapped about said layer of coarse screen.

* * * * *